(12) United States Patent
De Ligt et al.

(10) Patent No.: US 10,274,941 B2
(45) Date of Patent: Apr. 30, 2019

(54) SPREADSHEET VISUALIZATION FOR CONTROLLING AN INDUSTRIAL PROCESS

(71) Applicant: Honeywell International Inc., Morris Plains, NJ (US)

(72) Inventors: Ruud De Ligt, Vlaardingen (NL); Hristo Nikolov, Valkenburg (NL)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 267 days.

(21) Appl. No.: 15/073,997

(22) Filed: Mar. 18, 2016

(65) Prior Publication Data

US 2017/0269577 A1    Sep. 21, 2017

(51) Int. Cl.
*G05B 19/418* (2006.01)
*G06Q 10/06* (2012.01)
*G06Q 10/08* (2012.01)
*G06Q 50/04* (2012.01)

(52) U.S. Cl.
CPC ......... *G05B 19/4183* (2013.01); *G06Q 10/06* (2013.01); *G06Q 10/087* (2013.01); *G06Q 50/04* (2013.01); *G05B 2219/35011* (2013.01); *Y02P 90/30* (2015.11)

(58) Field of Classification Search
CPC ...... G05B 19/4183; G05B 2219/35011; G06Q 10/06; G06Q 10/087; G06Q 50/04
USPC ........................................................... 700/19
See application file for complete search history.

(56) References Cited

U.S. PATENT DOCUMENTS

| | | | |
|---|---|---|---|
| 7,676,280 B1* | 3/2010 | Bash | H05K 7/20836 700/17 |
| 8,473,854 B2 | 6/2013 | McGreevy et al. | |
| 2014/0288715 A1* | 9/2014 | Beaujeu | G05B 15/02 700/275 |
| 2014/0374090 A1* | 12/2014 | Gonzalez Davila | E21B 43/12 166/250.01 |
| 2016/0320759 A1* | 11/2016 | Macha | G05B 9/03 |

* cited by examiner

*Primary Examiner* — Robert A Cassity
(74) *Attorney, Agent, or Firm* — Jetter & Associates, P.A.; Neil R. Jetter

(57) ABSTRACT

A data processing system for controlling an industrial process includes a cross software platform layer including a data acquisition (DA) add-in and calculation add-in coupled to receive measured field data from a field layer including a process data link or Communication Interface Unit (CIU) coupled to processing equipment in the plant having associated field devices including sensors for providing measured field data and actuators configured to run the industrial process. A processor implements a DA algorithm to provide the DA add-in, a calculation algorithm to provide the calculation add-in, and a visualization algorithm all stored in a memory associated with the processor. The DA add-in acquires the measured field data from the field devices, the calculation add-in generates calculated data from the measured field data, and an application layer is for applying the visualization algorithm to the calculated data to populate cells of a spreadsheet.

12 Claims, 6 Drawing Sheets

| Tank Detail- TK009 | | | | — ▢ ✕ |
|---|---|---|---|---|

ALL [TK009 ▼]

Inventory

Product level & TOV
<u>2,160.0</u> [#] m    240.439  # m³
Measuring level

Water level & Water volume
[U] m    0.000  # m³

GOV    240.439  8# m³

Obs. density & Product Temperature
510.00  8# kg/m³    <u>3.86</u> [#] °C

Ref. density    CTL
517.00  8# kg/m³    0.997,17  #

GSV    239.759  8# m³
Available room    344.568  m³
Available GOV    240.439  m³

Corrections
Liquid in Vapour    247.491  # m³
Mass in Vapour    127.953  8# ton

Mass (in vacuum)
Total    251.908  8# ton
Mass calculated from D. Ref # GSV

LPG

Details

Product
API/ASTM    D 1250-80 53/54  C
☑ Range checking
Tref    15.00    °C
TC    9,198.000  8# E10-7/°C Tank
API/ASTM    28,594.567  m³
☑ Range checking    15.00  8# °C
CTSh Vapour room
Pressure    <u>238.3</u> [#] kPa
Temperature    <u>21.23</u> [#] °C
Lid/Vol Ratio    250.00
(ISO/TC28/SC 3 N)

Flow
0.0    Time to fill/empty
m³/h    0:00    h:min

*FIG. 3A*

Group Detail - ALL | Inventory

| Tank Name | Product name | GOV m³ | GSV m³ | Product code | Reference density kg/m³ | Water volume m³ | Shell capacity m³ |
|---|---|---|---|---|---|---|---|
| TK001 | Unleaded | 207.132 8# | 208.520 8# | A | 800.00 8# | 4.600 8# | 589.000 |
| TK002 | Unleaded | 500.833 8# | 503.087 8# | A | 826.30 8# | 2.000 8# | 588.000 |
| TK003 | Unleaded | 212.03 8# | 211.631 8# | A | 810.00 8# | 0.000 8# | 587.000 |
| TK004 | Unleaded | 36.946 8# | 36.792 8# | A | 810.20 8# | 13.937 8# | 586.000 |
| TK005 | abcdefgh | ******* F | ******* F | - | ******* F | 0.000 8 | 0.000 |
| TK006 | abcdefgh | ******* F | ******* F A | A | U | 0.000 8 | 0.000 |

FIG. 4

SPREADSHEET VISUALIZATION FOR CONTROLLING AN INDUSTRIAL PROCESS

FIELD

Disclosed embodiments relate to data processing and data visualization for controlling an industrial process.

BACKGROUND

Process control systems for industrial processes, whether distributed control system (DCS) or supervisory control and data acquisition (SCADA) systems, generally include one or more process controllers communicatively coupled to at least one host (e.g., an operator workstation) and to one or more process control devices (e.g., field devices) configured to communicate via analog, digital or combined analog/digital communication signals and/or protocols. Such process control systems are commonly used in chemical, pharmaceutical, pulp and paper manufacturing and petroleum processes. The field devices can comprise device controllers, valves, valve actuators or positioners, switches, transmitters (e.g., temperature, pressure, flow rate, or chemical composition sensors), performing functions within the process control system such as opening and/or closing valves and measuring process parameters. The process controller receives signals indicative of process measurements made by the field devices and/or other information pertaining to the field devices, uses this information to implement a control routine, and generates control signals over buses and/or other communication lines to the field devices to control the operation of the process control system.

Some industrial processes such as petroleum refining include storage tanks. Tank gauging is needed for the assessment of tank contents, tank inventory control and tank farm management. Radar and servo tank sensors (or gauges) help in accurate level gauging for refineries, tank terminals and petrochemical industries. Tank inventory systems utilize tank gauging data and provide connectivity for various field protocols that enable integration of existing field equipment. A set of standardized host interface areas are available to link software packages to control systems and business domain packages for advanced resource planning and asset management.

There are known tank inventory systems sufficiently flexible to handle tank farms ranging from a single tank up to more than 250 tanks, covering multiple locations and a variety of different gauges and interfaces. One such conventional tank inventory system comprises a pair of embedded software applications running in a Communication Interface Unit (CIU) that is essentially basically an embedded personal computer (PC) and a dedicated WINDOWS graphical user interface (GUI) application that provides GUIs includes standard formats for representing both text and graphics running at the PC at an operator station or distributed control system (DCS). This conventional tank inventory system requires high development and significant maintainability efforts because designing and implement a GUI to suit all customers takes considerable effort. An experienced programmer is needed to perform this task. All logic for performing calculations, rounding, input validation, (button) event handling, localization, etc. also needs good programming skills. Moreover, such conventional tank inventory systems generally provide only a limited provision for customization/extension for customers should they have any specific needs.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include data processing and visualization architectures and an associated methods for controlling industrial processes. An industrial process run in a plant including processing equipment having associated field devices includes sensors and actuators, a field layer including a process data link and/or a Communication Interface Unit (CIU) is coupled by a first bus to the field devices and by a second bus to a cross software platform layer that includes a data acquisition (DA) add-in and a calculation add-in. The calculation add-in can be implemented in a plurality of separate modules (e.g., DLLs). At least one processor implements a DA algorithm to provide the DA add-in, a calculation algorithm to provide the calculation add-in, and a visualization algorithm stored in a memory associated with the processor.

The DA add-in acquires measured field data from the field devices. The calculation add-in generates calculated data from the measured field data. The application layer applies the visualization algorithm to the calculated data to populate at least one spreadsheet. A control activity regarding the processing equipment is performed for controlling the industrial process using the visualization provided by the spreadsheet.

BRIEF DESCRIPTION OF THE DRAWINGS

FIG. 3A is an example of a tank inventory system screen from data provided by a disclosed cross software platform layer.

FIG. 4 is another example of a tank inventory system screen from a cross software platform layer showing mostly calculated data.

DETAILED DESCRIPTION

Figure 1:
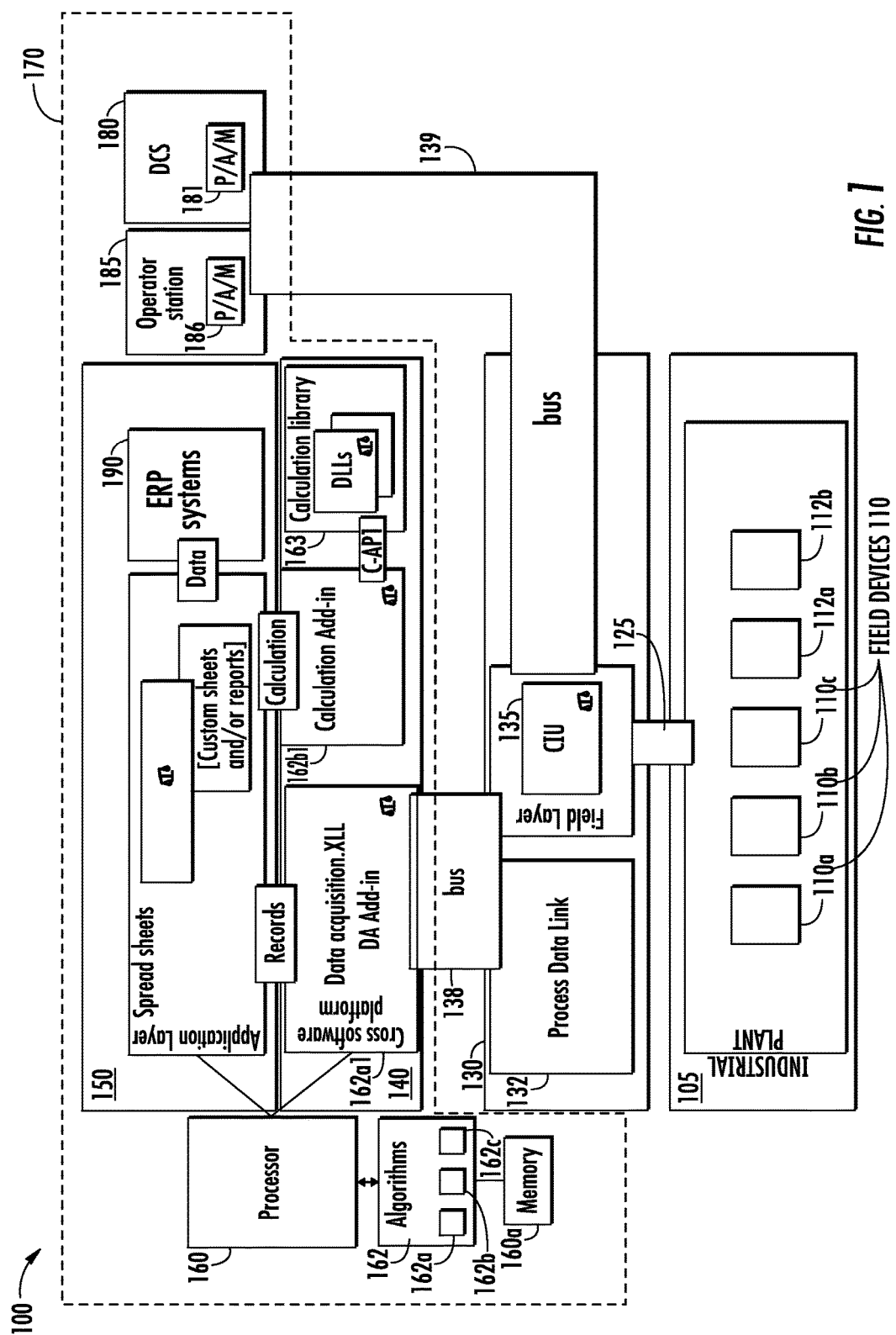
FIG. 1 is a depiction of an automatic control system including an example data processing and visualization system associated with an industrial plant configured to run an industrial process, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 depicts a portion of an automatic control system 100 including an example data processing and visualization system 170 associated with an industrial plant 105. The industrial plant 105 includes field devices 110 including sensors 110a, 110b providing measured field data and actuators 110c coupled to processing equipment 112a, 112b (such as tanks in a refining or distillation system) configured together to run an industrial process. The field devices 110 are coupled to a field layer 130.

The field layer 130 is shown including a process data link 132 and a Communication Interface Unit (CIU) 135 coupled to the field devices 110 by a first bus 125. The process data link 132 and CIU 135 each function as a raw process data provider so that only one of these units is generally needed. Process data link 132 can be a conventional data link for providing raw process data, such as a wired connection, wireless connection, data provided by MQ Telemetry Transport (MQTT) brokers, data from another spreadsheet, data acquired from the cloud, redundant software or a hardware component.

The CIU 135 functions as an input/output (IO) module for the automatic control system 100, and can be Ethernet enabled. The CIU 135 is shown coupled by a bus 139 to a distributed control system (DCS) 180 and to an operator station 185 that are both shown outside of the application layer 150 as they process a raw process data received from the field layer 130. DCS 180 generally has a Modbus input to acquire data directly from CIU 135 (or similar device) by a serial or an Ethernet link.

The data processing and visualization system 170 includes a cross software platform layer 140 and an application layer 150 that are implemented by one or more processors 160 in the automatic control. The processor 160 can comprise a microprocessor, digital signal processor (DSP), or microcontroller unit (MCU). The cross software platform layer 140 is coupled by a bus 138 to receive measured field data from the process data link 132 or CIU 135. The cross software platform layer 140 includes a data acquisition (DA) add-in 162a1 that acquires the measured field data from the process data link 132 and prepares the acquired data to deliver to the application layer 150. Data received DA add-in 162a1 from process data link 132 or CIU 135 can be in different protocols. One task of the DA add-in 162a1 is to turn all received data to a protocol the application layer 150 understands. For example, MQTT with topics such as Tank1/ProductLevel, Tank1/ProductTemperature. Other data preparation tasks performed by DA add-in 162a1 can include converting all data to the same dimension and resolution. Configuration of the DA add-in 162a1 can indicate the endpoint of the data (mapping table) as disclosed below.

The calculation add-in 162b1 that performs calculations on the measured field data. Application layer 150 functions to apply a disclosed visualization algorithm 162c to the measured field data from the DA add-in 162a1 and to the calculated data from the calculation add-in 162b1.

The visualization algorithm 162c populates with calculated data at least one spreadsheet visualization for a display, and optionally forwards the format of the populated data to the ERP system 190. SAP and BAAN are examples of commercially available enterprise resource planning (ERP) systems 190. The output from the application layer 150 can be used as an input for such ERP systems 190.

The visualization algorithm 162c allows a user (e.g. at operator station 185) to select a mapping that maps some or all the data available from the cross software platform layer 140 to populate cells of a spreadsheet in a user' designated fashion. For example, the data acquisition provided by the cross software platform layer 140 generally has a plurality of different data entities available, such as for tank applications Tank1/Level, Tank1/Temperature, Tank1/Volume. By filling a mapping table a user can map Tank1/Level to cell B3 of the spreadsheet, the Tank1/Temperature to cell C3 and the Tank1/Volume to cell D3. The user can change the mapping table at any time when he or she wants to move the data to other cells of the spreadsheet.

A separate processor 160 is shown in FIG. 1 that is generally part of computing device such as a personal computer (PC)/server. Processor 160 implements the cross software platform layer 140 including a DA algorithm 162a to provide the DA add-in 162a1, a calculation algorithm 162b to provide the calculation add-in 162b1, and the application layer 150 including the visualization algorithm 162c (collectively DACV 162) stored in a memory 160a associated with processor 160, and a processor/algorithms/memory associated with operator station 185 shown as P/A/M 186 and a processor/algorithms/memory associated with DCS 180 shown as P/A/M 181. An "add-in" as used herein is used in its conventional meaning in the art being a software utility or other program that can be added to a primary computer program.

The calculation add-in 162b1 generates calculated data from the field data and utilizes a calculation library 163 implemented as a plurality of separate modules (e.g., DLLs), shown providing American Petroleum Institute (API)-conforming calculations for tank inventory applications. In the case of tank inventory applications, calculation library 163 can implement other calculation methods, such as ASTM or GPA. The data acquisition provided by the cross software platform layer 140 can include a plurality of data entities available that by a mapping table customizing a visualization algorithm 162c from a user can map respective data entities to selected cells of the spread sheet. The user can change the mapping table at any time when he/she wants to move the data to other cells.

Figure 5:
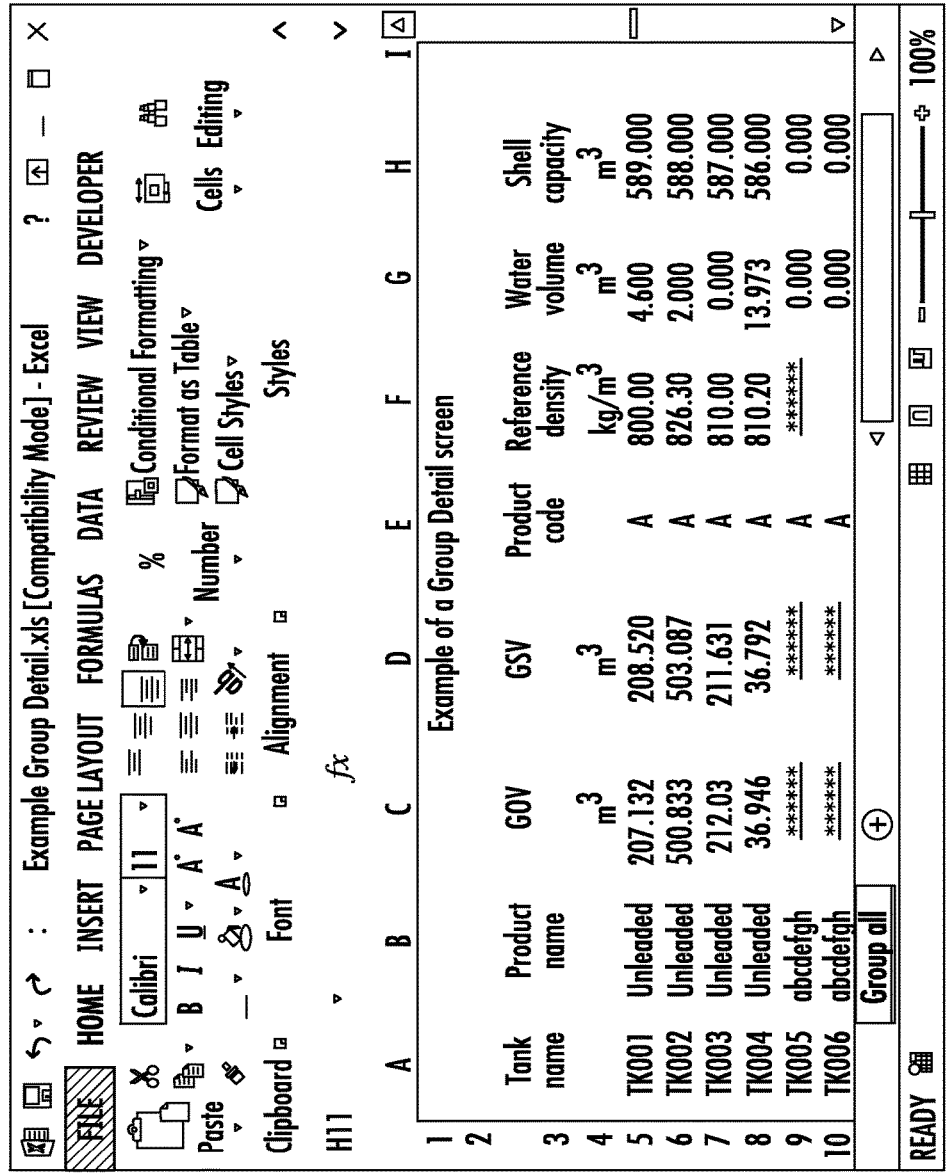
FIG. 5 is a screen created by a disclosed application layer implementing EXCEL to show an example spreadsheet screen showing tank inventory data populated as text in a plurality of cells.

The architecture of data processing system 170 thus provides a flexible and cost-effective data visualization system, which can be implemented as a Microsoft Office Application that may be compared to a known tank inventory architecture comprising a pair of embedded software running in a CIU and a dedicated Windows GUI application. In contrast with the known GUI application-based architectures, disclosed data processing system 170 is based on data acquisition and calculations provided a cross software platform layer 140 that can comprise an Excel Dot Net Application (EXCEL-DNA) add-ins, and the visualization algorithm 162c for visualization of the data provided by Microsoft EXCEL. As a spreadsheet visualizes the results such as shown in FIG. 5 described below, there is no need for the graphics in conventional GUI. Little development is needed for the skeleton (the cross software platform layer 140 for data acquisition and application layer 150 together define skeleton) while maximum flexibility is available for customers and their integrators to customize the system to their needs, such as by specifying a mapping table as described above. In contrast, the conventional way for process data visualization a programmer creates a GUI using WINDOWS forms. Such WINDOWS forms are recognized to be static and can only be changed by the programmer. By disclosed embodiments having all data available in the cross software platform layer 140 to map to cells of a spreadsheet, it can become a list the user maintains so that there is more freedom in designing a disclosed spreadsheet as custom calculations available in EXCEL as formulas and functions can be implemented by the user when offered by the license. One does not need programming skills to change the design and extend the spreadsheet application, as an EXCEL user having ordinary skill is expected to able to map data to cells of a spread sheet and implement custom formulas and functions.

Figure 2:
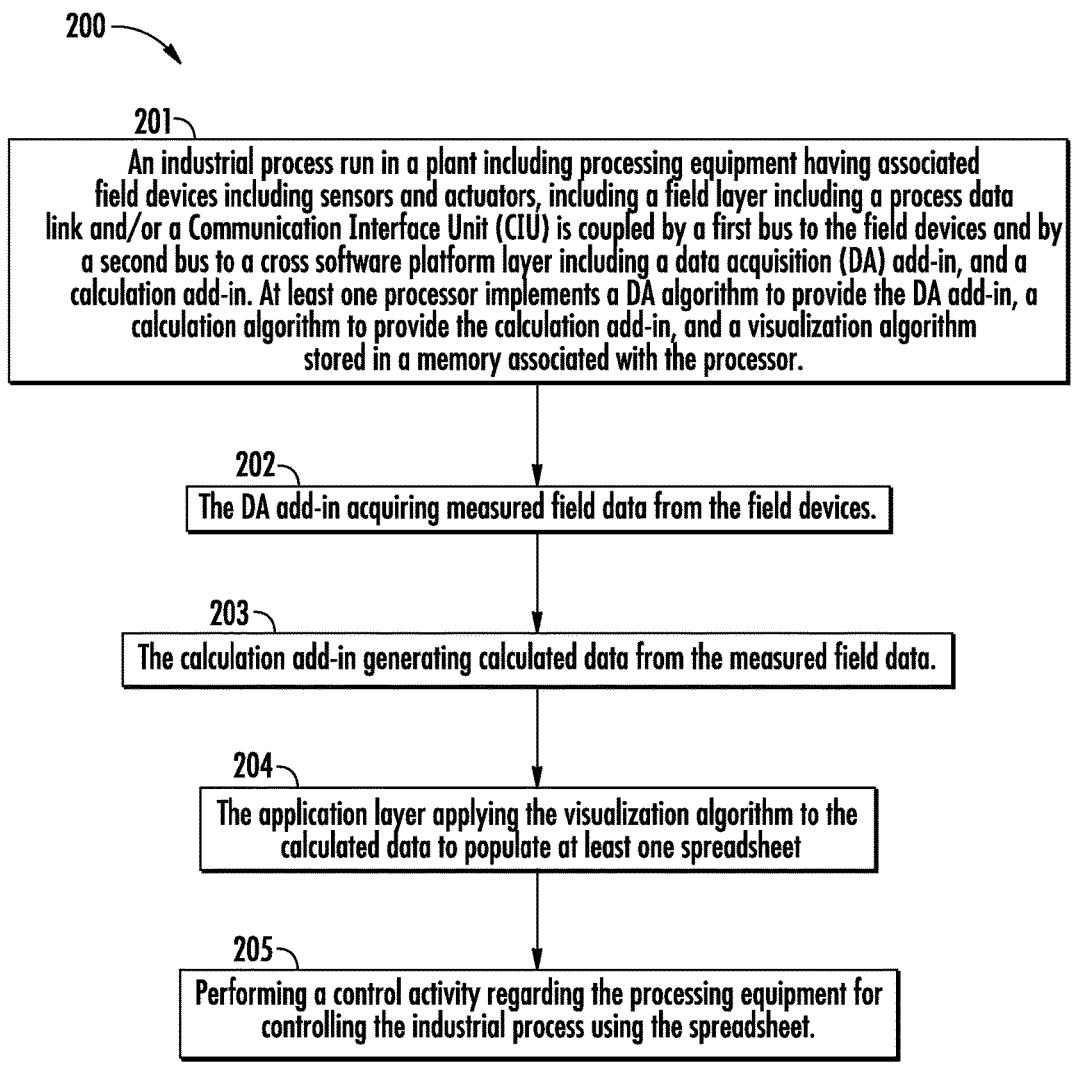
FIG. 2 is a flow chart that shows steps in a method of controlling an industrial process, according to an example embodiment.

FIG. 2 is a flow chart that shows steps in a method 200 of controlling industrial processes, according to an example embodiment. Step 201 comprises an industrial process run in a plant including processing equipment having associated field devices including sensors and actuators, including a field layer including a process data link and/or a Communication Interface Unit (CIU) coupled by a first bus to the field devices and by a second bus to a cross software platform layer including a data acquisition (DA) add-in, calculation add-in. The calculation add-in can be implemented in a plurality of separate modules (e.g., DLLs). At least one processor implements a DA algorithm to provide the DA add-in, a calculation algorithm to provide the calculation add-in, and a visualization algorithm stored in a memory associated with the processor.

Step 202 comprises the DA add-in acquiring measured field data from the field devices. Step 203 comprises the calculation add-in generating calculated data from the measured field data. Step 204 comprises the application layer applying the visualization algorithm to the calculated data to populate at least one spreadsheet. The user can map all data available in cross software platform layer 140 to cells of the spreadsheet. Step 205 comprises performing a control activity regarding the processing equipment for controlling the industrial process using the spreadsheet.

The second bus 138 can comprise a serial communications protocol bus (e.g., Modbus) that provides the field data from the CIU to the DA add-in. The serial communications protocol bus can be a wired communications protocol bus or a wireless communications protocol bus.

The processing equipment can includes at least one storage tank, wherein the sensors include at least one tank level gauge, and the spreadsheet includes tank inventory information. The performing control activity can comprise automatic control activity. The application layer can provide a user fillable and modifiable mapping table for mapping the calculated data and measured data to selected cells in the spreadsheet.

Disclosed believed to be novel features which contribute to low development cost for disclosed data processing system 170 include the cross software platform layer 140, such as embodied as an EXCEL-DNA performs real-time data acquisition from a CIU 135 such as via a Modbus communication. Moreover, an EXCEL-DNA connects to a calculation library to process the obtained data, and an EXCEL spreadsheet to visualizes the results so that there is no use of a conventional GUI.

In addition, a modular calculation library 163 is included, where calculation algorithms are implemented in separate modules (aka dynamic-link libraries (DLLs)). A DLL file is an executable file that allows programs to share code and other resources necessary to perform particular tasks, such as custom calculations. Microsoft WINDOWS provides DLL files that contain functions and resources that allow WINDOWS-based programs to operate in the WINDOWS environment. This enables easy customization at the level of individual calculations by simply providing a DLL with an alternative implementation, easy certification at the level of individual calculations, where the DLLs can be approved by Weights and Measures authorities separately.

A disclosed data processing and visualization system 170 is generally a software product running on hardware including a processor 160. The application layer 150 can be run on a personal computer (PC platform). Cross software platform layer 140 can run on a PC, but can also be run on a CIU 135, such as the CIU 888 marketed by Honeywell International which is essentially an embedded PC.

Examples

Disclosed embodiments are further illustrated by the following specific Examples, which should not be construed as limiting the scope or content of this Disclosure in any way.

Figure 3B:
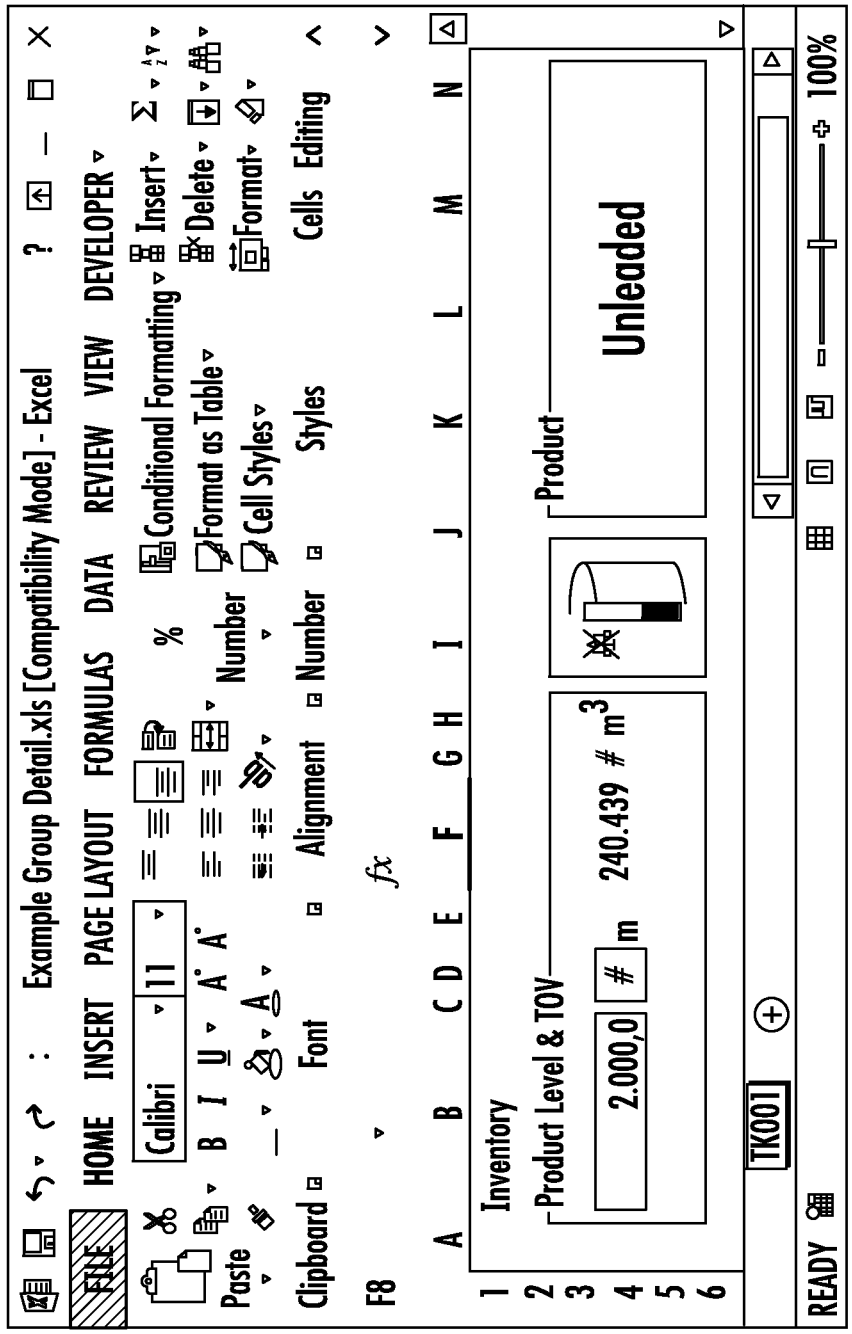
FIG. 3B is a snippet of a spreadsheet showing the view shown FIG. 3A implemented as a spreadsheet.

Examples of a tank inventory system screen from data provided by a disclosed cross software platform layer 140 is shown in FIG. 3A. Measured data is shown in bold. Except for some configuration values such as reference temperature (Tref) most other data shown is calculated data. The tank inventory system screens shown in FIG. 4 from a cross software platform layer 140 shows mostly calculated data. FIG. 5 is a screen created by a disclosed application layer 150 implementing EXCEL to show an example spreadsheet screen showing tank inventory data populated as text in a plurality of cells.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method using a spreadsheet for providing visualization of tank inventory information to control an industrial process, comprising:

said industrial process run in a plant including processing equipment includes at least one storage tank and associated field devices including sensors and actuators, said sensors including at least one tank level gauge, wherein a field layer including at least one of a process data link and a Communication Interface Unit (CIU) is coupled by a first bus to said field devices and by a second bus to a cross software platform layer including a data acquisition (DA) add-in, a calculation add-in, and at least one processor which implements a data acquisition (DA) algorithm to provide said DA add-in, a calculation algorithm to provide said calculation add-in, and a visualization algorithm stored in a memory associated with said processor;

acquiring, by said DA add-in of said cross software platform layer, measured field data from said field devices via at least one of said process data link or said CIU, wherein data received from said process data link is in a different protocol from the data received from said CIU and said DA add-in converting said acquired measured field data to a protocol that an application layer understands;

generating, by said calculation add-in, calculated data from said measured field data;

applying, by the application layer, said visualization algorithm to said calculated data to populate said spreadsheet for the visualization of said tank inventory information;

providing, on a tank inventory system screen, by said application layer, a user fillable and modifiable mapping table for mapping said calculated data and said measured field data to selected cells in said spreadsheet for the visualization; and performing an automatic control activity to at least some of the field devices to control said processing equipment, thereby controlling said industrial process using said spreadsheet and the visualization of said tank inventory information.

2. The method of claim 1, wherein said second bus comprises a serial communications protocol bus that provides said measured field data from said CIU to said DA add-in.

3. The method of claim 2, wherein said serial communications protocol bus is a wired communications protocol bus.

4. The method of claim 2, wherein said serial communications protocol bus is a wireless communications protocol bus.

5. The method of claim 1, wherein said calculation add-in is implemented in a plurality of separate modules.

6. A data processing system using a spreadsheet for providing visualization of tank inventory information to control an industrial process run in a plant, comprising:

a cross software platform layer including a data acquisition (DA) add-in and calculation add-in coupled by a second bus to receive measured field data from a field layer including at least one of a process data link and a Communication Interface Unit (CIU) is coupled by a first bus to processing equipment including at least one storage tank in said plant and associated field devices including sensors for providing measured field data and actuators configured to run said industrial process, said sensors including at least one tank level gauge, at least one processor which implements a data acquisition (DA) algorithm to provide said DA add-in, a calculation algorithm to provide said calculation add-in, and a visualization algorithm all stored in a memory associated with said processor;

said DA add-in of said cross software platform layer for acquiring said measured field data from said field devices via at least one of said process data link or said CIU, wherein data received from said process data link is in a different protocol from the data received from said CIU and said DA add-in converting said acquired measured field data to a protocol that an application layer understands;

said calculation add-in for generating calculated data from said measured field data;

the application layer for applying said visualization algorithm to said calculated data to populate said spreadsheet for the visualization of said tank inventory information;

provide, on a tank inventory system screen, by said application layer, a user fillable and modifiable mapping table for mapping said calculated data and said measured field data to selected cells in said spreadsheet for the visualization; and perform an automatic control activity to at least some of the field devices to control said processing equipment, thereby controlling said industrial process using said spreadsheet and the visualization of said tank inventory information.

7. The data processing system of claim 6, wherein said second bus comprises a serial communications protocol bus that provides said measured field data from said CIU to said cross software platform layer in real-time.

8. The data processing system of claim 7, wherein said serial communications protocol bus is a wired communications protocol bus.

9. The data processing system of claim 7, wherein said serial communications protocol bus is a wireless communications protocol bus.

10. The data processing system of claim 6, wherein said calculation add-in is implemented in a plurality of separate modules.

11. A computer program product, comprising:

a non-transitory data storage medium that includes program instructions executable by a processor to enable said processor to execute a method using a spreadsheet for providing visualization of tank inventory information to an industrial process run in a plant including processing equipment includes at least one storage tank and associated field devices including sensors and actuators, said sensors including at least one tank level gauge, wherein a field layer including at least one of a process data link and a Communication Interface Unit (CIU) is coupled by a first bus to said field devices and by a second bus to a cross software platform layer, including a data acquisition (DA) add-in, a calculation add-in, said program instructions including:

code for implementing said cross software platform layer to include a DA algorithm to provide said data acquisition (DA) add-in and a calculation algorithm to provide said calculation add-in, and an application layer including a visualization algorithm all stored in said data storage medium, said DA add-in of said cross software platform layer acquiring measured field data from said field devices via at least one of said process data link or said CIU, wherein data received from said process data link is in a different protocol from the data received from said CIU and said DA add-in converting said acquired measured field data to a protocol that said application layer understands;

said calculation add-in generating calculated data from said measured field data;

said visualization algorithm using said calculated data to populate said spreadsheet for the visualization of said tank inventory information;

provide, on a tank inventory system screen, by said application layer, a user fillable and modifiable mapping table for mapping said calculated data and said measured field data to selected cells in said spreadsheet for the visualization; and perform an automatic control activity to at least some of the field devices to control said processing equipment, thereby controlling said industrial process using said spreadsheet and the visualization of said tank inventory information.

12. The computer program product of claim 11, wherein said calculation add-in is implemented in a plurality of separate modules.

\* \* \* \* \*